United States Patent
Okochi

(10) Patent No.: US 10,128,704 B2
(45) Date of Patent: Nov. 13, 2018

(54) ROTOR OF ROTARY ELECTRIC MACHINE

(71) Applicant: TOYOTA JIDOSHA KABUSHIKI KAISHA, Toyota-shi, Aichi-ken (JP)

(72) Inventor: Toshinori Okochi, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 156 days.

(21) Appl. No.: 15/202,049

(22) Filed: Jul. 5, 2016

(65) Prior Publication Data
US 2017/0012503 A1    Jan. 12, 2017

(30) Foreign Application Priority Data
Jul. 6, 2015 (JP) ................ 2015-135387

(51) Int. Cl.
*H02K 9/19* (2006.01)
*H02K 1/32* (2006.01)
*H02K 1/27* (2006.01)

(52) U.S. Cl.
CPC ............ *H02K 1/32* (2013.01); *H02K 1/2766* (2013.01)

(58) Field of Classification Search
CPC .. H02K 1/27; H02K 9/19; H02K 1/32; H02K 1/2766; H02K 1/22; H02K 9/197; H02K 5/1737; H02K 7/086; H02K 7/088
USPC .................... 310/60 A, 61, 52–64
See application file for complete search history.

(56) References Cited

U.S. PATENT DOCUMENTS

| | | | | |
|---|---|---|---|---|
| 3,684,906 A | * | 8/1972 | Lenz | H02K 1/32 310/61 |
| 4,301,386 A | * | 11/1981 | Schweder | H02K 1/32 310/211 |
| 4,341,966 A | * | 7/1982 | Pangburn | H02K 17/16 310/61 |
| 4,365,178 A | * | 12/1982 | Lenz | H02K 1/32 310/216.053 |
| 4,395,816 A | * | 8/1983 | Pangburn | H02K 1/32 164/DIG. 10 |
| 4,499,660 A | * | 2/1985 | Lenz | H02K 1/32 164/109 |
| 6,727,609 B2 | * | 4/2004 | Johnsen | H02K 1/32 310/52 |

(Continued)

FOREIGN PATENT DOCUMENTS

| | | | |
|---|---|---|---|
| JP | 2006-067777 A | | 3/2006 |
| JP | 2006067777 A | * | 3/2006 |

(Continued)

*Primary Examiner* — Naishadh Desai
(74) *Attorney, Agent, or Firm* — Sughrue Mion, PLLC

(57) ABSTRACT

A rotor core includes at least one core refrigerant passage configured to release a refrigerant to a gap between the rotor core and a stator. The core refrigerant passage includes: a central refrigerant passage provided radially inside a permanent magnet so as to extend in an axial direction, the central refrigerant passage being opened on axial end surfaces of the rotor core; an inner refrigerant passage communicating the shaft refrigerant passage with the central refrigerant passage; an outer refrigerant passage communicating the central refrigerant passage with the gap; and dams provided on both axial-end sides of the central refrigerant passage relative to the outer refrigerant passage so as to project toward a radially inner side from a radially outer side in the central refrigerant passage.

2 Claims, 6 Drawing Sheets

(56) References Cited

U.S. PATENT DOCUMENTS

| | | | | |
|---|---|---|---|---|
| 8,847,445 B2* | 9/2014 | Kowalski | H02K 1/32 | 310/58 |
| 2006/0071568 A1* | 4/2006 | Kimura | H02K 1/2706 | 310/156.56 |
| 2010/0194220 A1* | 8/2010 | Tatematsu | H02K 1/2766 | 310/61 |
| 2010/0237725 A1* | 9/2010 | Tatematsu | H02K 1/32 | 310/61 |
| 2012/0248906 A1* | 10/2012 | Hayslett | H02K 1/2766 | 310/61 |
| 2013/0221772 A1* | 8/2013 | Miyamoto | H02K 9/19 | 310/54 |
| 2014/0175916 A1* | 6/2014 | Chamberlin | H02K 9/19 | 310/54 |

FOREIGN PATENT DOCUMENTS

| | | | | |
|---|---|---|---|---|
| JP | 2008-228522 A | | 9/2008 | |
| JP | WO 2011132784 A1 * | | 10/2011 | H02K 1/32 |
| JP | 2015089316 A * | | 5/2015 | |
| JP | 2016-012979 A | | 1/2016 | |
| JP | 2016-054608 A | | 4/2016 | |
| WO | 2015/198118 A1 | | 12/2015 | |

* cited by examiner

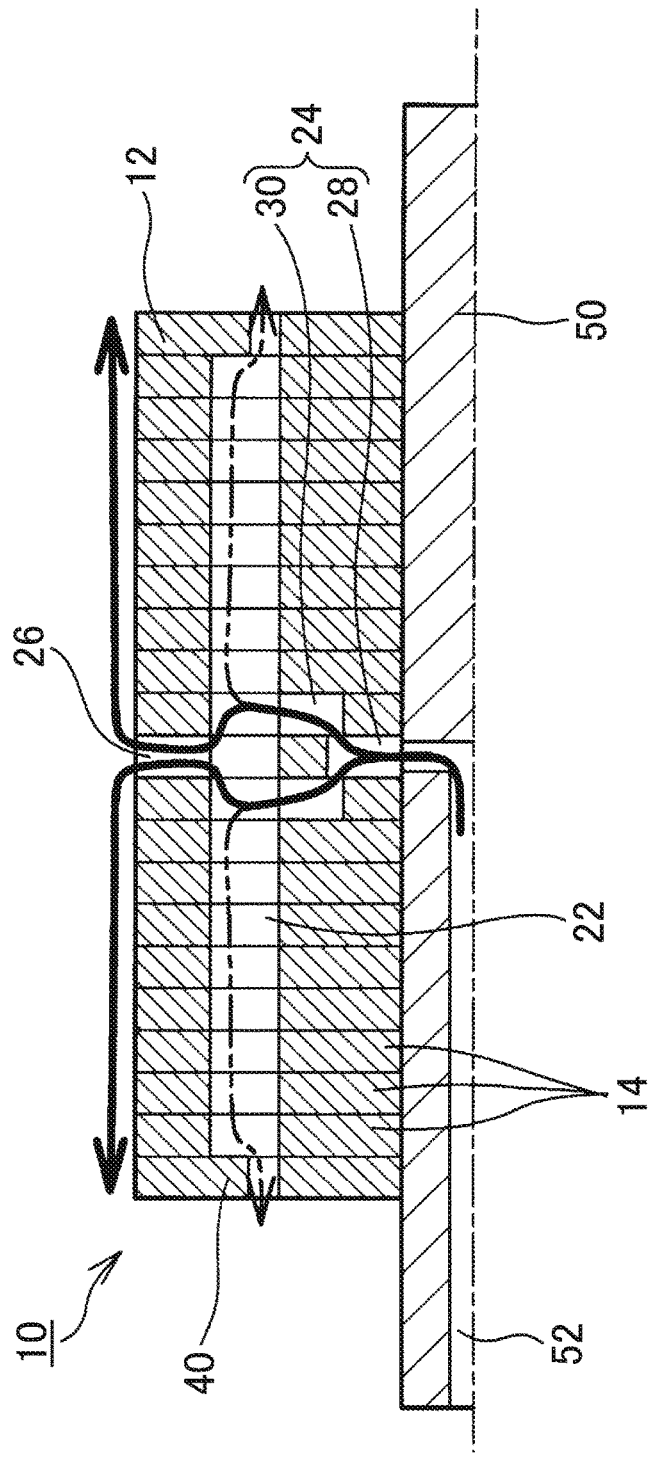

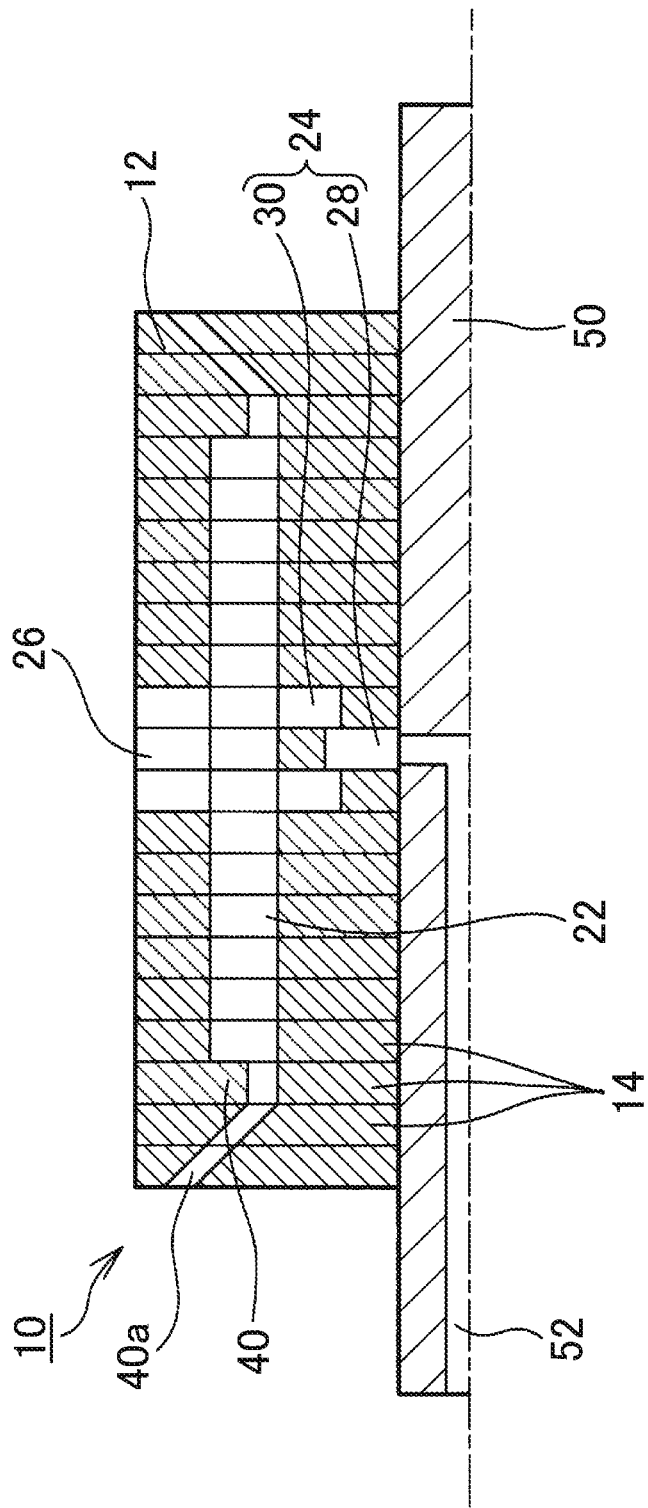

ROTOR OF ROTARY ELECTRIC MACHINE

INCORPORATION BY REFERENCE

The disclosure of Japanese Patent Application No. 2015-135387 filed on Jul. 6, 2015 including the specification, drawings and abstract is incorporated herein by reference in its entirety.

BACKGROUND OF THE INVENTION

1. Field of the Invention

The present invention relates to a rotor of a rotary electric machine, the rotor including a rotor core and a permanent magnet embedded in the rotor core.

2. Description of Related Art

In a permanent magnet synchronous rotary electric machine configured such that permanent magnets are embedded in a rotor core, when a temperature of a rotor increases along with driving of the rotary electric machine, not only magnet performance decreases to decrease torque and efficiency, but also demagnetization of the permanent magnets occurs due to high temperature. If a magnet having a high coercive force is employed, a problem with demagnetization can be avoided. However, in this case, it is necessary to increase a content of heavy rare earth, which causes an increase in cost.

In view of this, in order to cool down the rotary electric machine, various structures have been suggested conventionally. For example, Japanese Patent Application Publication No. 2008-228522 (JP 2008-228522 A) describes a technique in which oil supplied from a supply oil passage formed inside a rotating shaft is discharged through a plurality of cooling oil passages formed inside a rotor core, so as to cool down a rotor. In JP 2008-228522 A, slots extending on q-axes of the rotary electric machine are formed on each of a plurality of electromagnetic steel sheets arranged consecutively in an axial direction, such that the slots on respective electromagnetic steel sheets are formed in radial ranges shifted from each other, thereby forming the cooling oil passages extending on the q-axes.

Further, Japanese Patent Application Publication No. 2006-067777 (JP 2006-067777 A) describes a technique in which oil supplied from a supply oil passage formed inside a rotating shaft is discharged through a plurality of cooling oil passages formed inside a rotor core, so as to cool down a rotor. In JP 2006-067777 A, the cooling oil passages extend on d-axes of a rotary electric machine. In JP 2006-067777 A, the plurality of oil passages extending in a radial direction is arranged in an axial direction.

SUMMARY OF THE INVENTION

According to the techniques in JP 2008-228522 A and JP 2006-067777 A, a refrigerant is all released into a gap between the rotor core and a stator. By discharging the refrigerant into the gap, it is possible to cool down a radially outer surface of the rotor core, a radially inner surface of the stator core, and a stator coil. However, when a large amount of refrigerant is released into the gap, a shearing resistance of the refrigerant filled in the gap increases, thereby resulting in that a motor torque loss (so-called drag loss) due to dragging of the refrigerant increases. The conventional techniques of JP 2008-228522 A and JP 2006-067777 A are not enough for a measure to such a drag loss.

In view of this, the present invention provides a rotor for a rotary electric machine that can reduce a drag loss while effectively cooling down a radially outer surface of a rotor core, a radially inner surface of a stator core, and a stator coil by supply of a refrigerant into a gap between the rotor core and a stator.

A rotor of a rotary electric machine according to one aspect of the present invention is a rotor including a rotor core, a permanent magnet embedded in the rotor core, and a rotating shaft, and the rotor is supported by the rotating shaft. The rotating shaft includes a shaft refrigerant passage through which a refrigerant flows, and the rotor core includes at least one core refrigerant passage that guides the refrigerant supplied from the shaft refrigerant passage to a radially outer end of the rotor core so that the refrigerant is released to a gap between the rotor core and a stator. The core refrigerant passage includes: a central refrigerant passage provided radially inside the permanent magnet so as to extend in an axial direction, the central refrigerant passage being opened on axial end surfaces of the rotor core; an inner refrigerant passage communicating the shaft refrigerant passage with the central refrigerant passage; an outer refrigerant passage communicating the central refrigerant passage with the gap; and a dam provided on both axial-end sides of the central refrigerant passage, the dams provided axially outside the outer refrigerant passage. The dams being projects from an radially outer side toward an radially inner side in the central refrigerant passage.

According to one aspect of the present invention, in a case where an amount of the refrigerant supplied from the shaft refrigerant passage is small, the discharge of the refrigerant toward both axial ends is restrained by the dam, so that the refrigerant is released to the gap from the outer refrigerant passage, thereby making it possible to effectively cool down the radially outer surface of the rotor core, the radially inner surface of the stator core, and the stator coil. Further, in a case where an amount of the refrigerant supplied from the shaft refrigerant passage is large, the refrigerant is partially discharged across the dams toward both axial ends, thereby making it possible to restrain an increase in a motor torque loss due to dragging of the refrigerant caused when an excessive amount of the refrigerant is released from the outer refrigerant passage. Further, since the refrigerant is released outside from the axial end surfaces through the central refrigerant passage, it is possible to equally cool down the entire rotor core in the axial direction, thereby making it possible to effectively cool down the rotor core. That is, according to the present invention, it is possible to reduce a drag loss while effectively cooling down the rotor.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a view illustrating a flow of a refrigerant;

FIG. 5 is a view illustrating a configuration of another rotor.

DETAILED DESCRIPTION OF EMBODIMENTS

Figure 1:
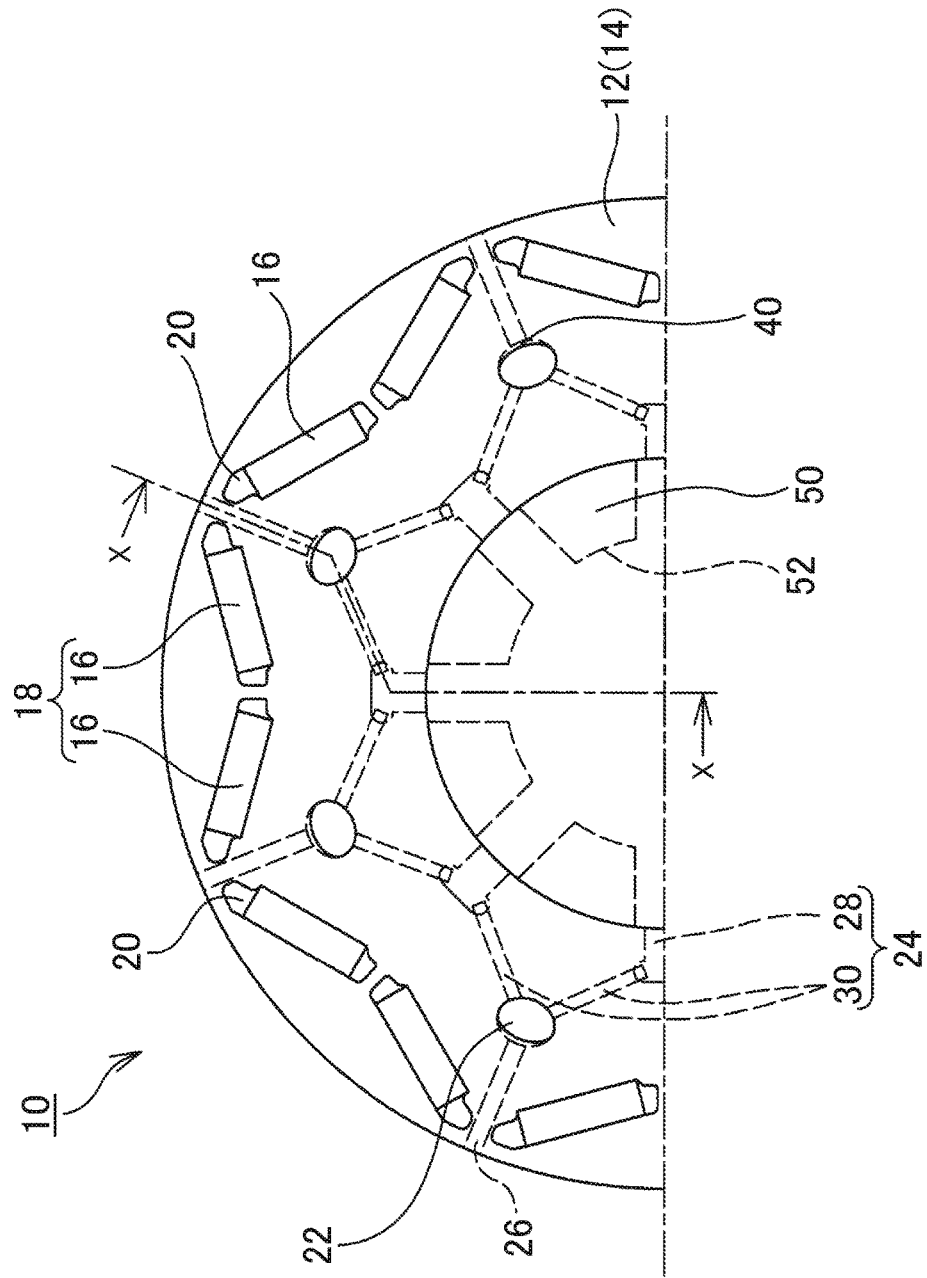
FIG. 1 is an axial view of a rotor of a rotary electric machine according to one embodiment of the present invention.
Figure 2:
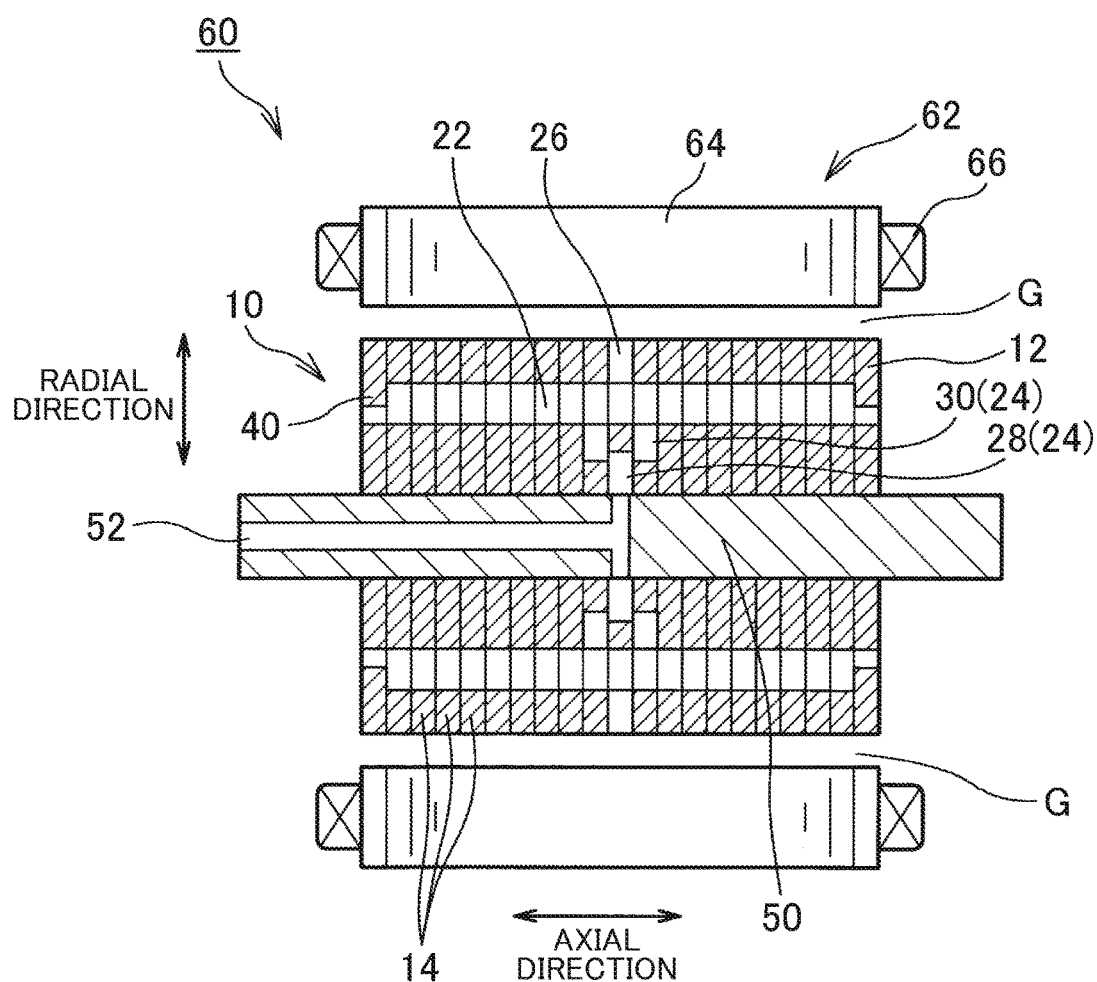
FIG. 2 is a sectional view of the rotary electric machine taken along a line X-X in FIG. 1.

An embodiment of the present invention will be described below with reference to the drawings. FIG. 1 is an axial view of a rotor 10 to be used for a rotary electric machine 60 according to the embodiment of the present invention. Further, FIG. 2 is a sectional view of the rotary electric machine 60 taken along a line X-X in FIG. 1. Further, FIG. 3 is a view illustrating a flow of a refrigerant. However, in order to make the invention clearly understandable, a radial length in FIGS. 2, 3 is not the same as in FIG. 1, but is illustrated in a slightly exaggerated manner. Further, a thickness or the like of each electromagnetic steel sheet 14 is also different from an actual thickness or the like.

The rotary electric machine 60 of the present embodiment is a permanent magnet synchronous rotary electric machine configured such that permanent magnets 16 are embedded in a rotor core 12. The rotary electric machine 60 includes a rotor 10 and a stator 62. The stator 62 is constituted by a generally circular stator core 64 having a plurality of teeth formed on its inner periphery, and a stator coil 66 wound around each of the teeth. The rotor 10 is disposed inside the stator 62 so as to be concentric to the stator 62. A gap G having a generally uniform distance is formed between a radially outer surface of the rotor 10 and a radially inner surface of the stator 62.

The rotor 10 includes a rotor core 12, and permanent magnets 16 embedded in the rotor core 12. A rotating shaft 50 is passed through a center of the rotor core 12, and the rotating shaft 50 is supported rotatably relative to a case (not shown) via a bearing (not shown) or the like. The rotor 10 is also rotatable together with the rotating shaft 50.

The rotor core 12 is configured such that a plurality of electromagnetic steel sheets 14 is laminated in an axial direction. Each of the electromagnetic steel sheets 14 has a disk shape, and is a silicon electromagnetic steel sheet or the like, for example. A plurality of magnet holes 20 in which the permanent magnets 16 are embedded is formed near an outer periphery of the rotor core 12. The plurality of magnet holes 20 is aligned equally in a circumferential direction of the rotor core 12, and each of the magnet holes 20 penetrates through the rotor core 12 in a rotor axis direction (a vertical direction with respect to a plane of paper in FIG. 1).

The permanent magnet 16 constituting a magnetic pole 18 is embedded in each of the magnet holes 20. One magnetic pole 18 is constituted by two permanent magnets 16. The two permanent magnets 16 constituting one magnetic pole 18 are placed in a posture in which the permanent magnets 16 expand generally in a V-shape toward the outer periphery of the rotor core 12. In the present embodiment, 16 permanent magnets 16 and 8 magnetic poles 18 are disposed near a radially outer end of the rotor core 12. Each of the permanent magnets 16 has a flat rectangular section, and has a plate shape having generally the same axial length as the rotor core 12. Note that the number of permanent magnets 16 and the number of magnetic poles 18 described herein are just one example, and the numbers thereof may be changed appropriately. Further, in the present embodiment, one magnetic pole 18 is constituted by a pair of permanent magnets 16, but one magnetic pole 18 may be constituted by one permanent magnet 16 or more permanent magnets 16.

A refrigerant passage through which a refrigerant to cool down the rotor 10 and the stator 62 passes is formed in the rotating shaft 50 and the rotor core 12. The refrigerant passage is roughly divided into a shaft refrigerant passage 52 formed in the rotating shaft 50, and a core refrigerant passage formed in the rotor core 12. The shaft refrigerant passage 52 is a hole passing through a shaft center of the rotating shaft 50. The shaft refrigerant passage 52 extends from one end of the rotating shaft 50 to a generally axial center, and then, the shaft refrigerant passage 52 is branched in a radial direction so as to extend to a radially inner end of the rotor core 12.

As will be described later more specifically, the core refrigerant passage is a refrigerant passage that guides a refrigerant supplied from the shaft refrigerant passage 52 to a radially outer end of the rotor core 12 or both axial ends of the rotor core 12, and then releases the refrigerant outside the rotor core 12. The refrigerant is supplied, by a pump or the like, to the shaft refrigerant passage 52 from a refrigerant source provided outside the rotary electric machine 60. Most of the refrigerant thus supplied to the shaft refrigerant passage 52 is released to the gap G from the radially outer end of the rotor core 12 through the core refrigerant passage. The refrigerant thus released to the gap G moves ahead through the gap G, and then falls to a case bottom of the rotary electric machine 60. Further, an excessive refrigerant that cannot be released to the gap G is released outside from both axial ends of the rotor core 12 so as to fall to the case bottom. The refrigerant thus falling to the case bottom is recovered appropriately and cooled down, and then returned back to the refrigerant source. Note that the refrigerant is not limited in particular, provided that the refrigerant is liquid that can exhibit preferred cooling performance with respect to the rotor 10 and the stator 62. However, in the present embodiment, cooling oil is used as the refrigerant.

The core refrigerant passage is roughly divided into central refrigerant passages 22, inner refrigerant passages 24, and outer refrigerant passages 26. The central refrigerant passage 22 is a refrigerant passage extending in an axial direction of the rotor core 12 so as to penetrate the rotor core 12. The central refrigerant passage 22 is provided radially inside the permanent magnets 16 and on a q-axis of the rotary electric machine 60. Note that the q-axis is an axis passing a central position (a central position of a salient pole) between adjacent magnetic poles 18 and a center of the rotor 10 as is generally known. Further, a d-axis is an axis passing a central position of one magnetic pole 18 and a center of the rotor 10. The central refrigerant passages 22 of the present embodiment are provided on respective q-axes, and the number of central refrigerant passages 22 is the same as the number of magnetic poles 18.

The central refrigerant passage 22 has openings on axial end surfaces of the rotor core 12, so that the refrigerant is discharged from the openings. Dams 40 projecting toward a radially inner side from a radially outer side of the central refrigerant passage 22 are formed at both axial ends of the central refrigerant passage 22. Due to the dams 40, a sectional area of the central refrigerant passage 22 is suddenly narrowed at both axial ends. Central apertures 22a constituting the central refrigerant passages 22 are formed in each electromagnetic steel sheet. In the present embodiment, in order to form the dams 40, the central apertures 22a formed at both axial ends are made smaller than the central aperture 22a formed in the other electromagnetic steel sheets 14.

The inner refrigerant passage 24 is a refrigerant passage communicating the shaft refrigerant passage 52 with the central refrigerant passage 22. The inner refrigerant passage 24 is provided generally in a generally axial center of the rotor core 12. The inner refrigerant passage 24 includes a first refrigerant passage 28 extending from a radially inner end of the rotor core 12, and a second refrigerant passage 30 communicating the first refrigerant passage 28 with the central refrigerant passage 22. The first refrigerant passage 28 is a passage extending on the d-axis, and one end thereof is connected to the shaft refrigerant passage 52, and the other end thereof stops radially inside the permanent magnets 16. The other end of the first refrigerant passage 28 expands generally in an elliptical shape so as to easily communicate with the second refrigerant passages 30. The first refrigerant passages 28 are provided on respective d-axes, and the number of first refrigerant passages 28 included in one inner refrigerant passage 24 is the same as the number of magnetic poles 18.

The second refrigerant passages 30 are passages provided radially inside the permanent magnets 16. One end of the second refrigerant passage 30 is placed at a position where the one end overlaps with the other end of its corresponding first refrigerant passage 28. Accordingly, as illustrated in FIG. 2, the electromagnetic steel sheet 14 in which the second refrigerant passages 30 are formed is adjacently laminated on the electromagnetic steel sheet 14 in which the first refrigerant passages 28 are formed, so that the second refrigerant passages 30 communicate with their corresponding first refrigerant passages 28. The other end of the second refrigerant passage 30 is connected to its corresponding central refrigerant passage 22 as illustrated in FIG. 1. In the present embodiment, two second refrigerant passages 30 extending in opposite directions are connected to one first refrigerant passage 28. Further, two second refrigerant passages 30 extending from different first refrigerant passages 28 are connected to one central refrigerant passage 22. Accordingly, the number of second refrigerant passages 30 included in one inner refrigerant passage 24 is twice the number of first refrigerant passages 28, and is twice the number of magnetic poles 18.

The outer refrigerant passage 26 is a refrigerant passage extending outwardly in the radial direction from the generally axial center of the central refrigerant passage 22 so as to communicate with the gap G. The outer refrigerant passage 26 extends in the radial direction from the radially outer end of the rotor core 12, and is connected to its corresponding central refrigerant passage 22. The outer refrigerant passage 26 has an opening on a radially outer surface of the rotor core 12, so that the refrigerant is discharged from the opening. Here, as apparent from FIG. 2, the outer refrigerant passages 26 are provided only in the generally axial center of the rotor core 12. In other words, on the radially outer surface, outlets for the refrigerant (the radially outer ends of the outer refrigerant passages 26) are provided only in an axial center of the rotor core 12. Further, the outer refrigerant passages 26 are provided on respective q-axes, and the number of outer refrigerant passages 26 is the same as the number of magnetic poles 18.

The core refrigerant passage as described above is formed such that slots and holes are formed appropriately in the electromagnetic steel sheets 14 constituting the rotor core 12. Further, the electromagnetic steel sheets 14 constituting the rotor core 12 have different shapes depending on axial positions where the electromagnetic steel sheets 14 are laminated. This will be described with reference to FIGS. 4A to 4C.

Figure 4A:
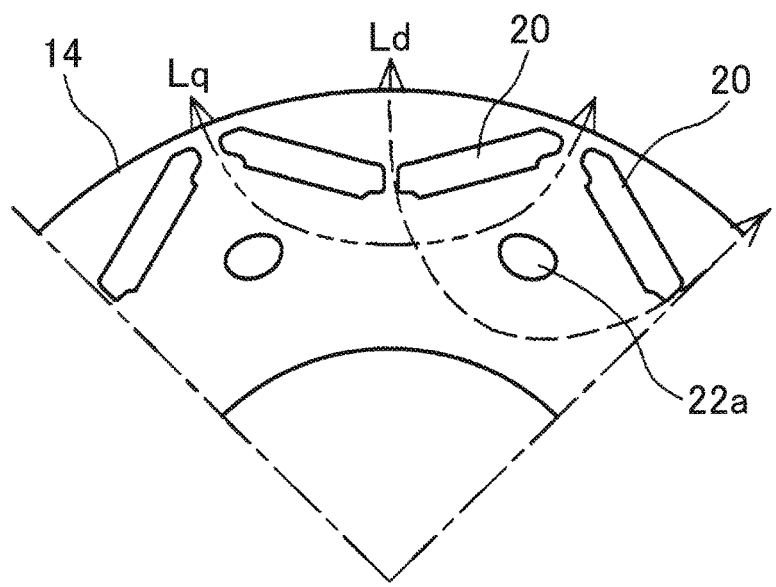
FIG. 4A is a view illustrating one example of an electromagnetic steel sheet.

There are roughly three types of electromagnetic steel sheets 14 constituting the rotor core 12. A first type is an electromagnetic steel sheet 14 in which a plurality of magnet holes 20 and central apertures 22a are formed as illustrated in FIG. 4A. The electromagnetic steel sheets 14 of this type are disposed in a large part except for a vicinity of the axial center of the rotor core 12. The central apertures 22a are through-holes disposed on the radially inside the magnet holes 20 and on respective q-axes and constitute the central refrigerant passages 22. The central apertures 22a formed in the electromagnetic steel sheets 14 placed at both axial ends are configured such that radially outer edges thereof are placed closer to the radially inner side than the central apertures 22a formed in the other electromagnetic steel sheets 14 and have a size smaller than the central apertures 22a formed in the other electromagnetic steel sheets 14.

Figure 4B:
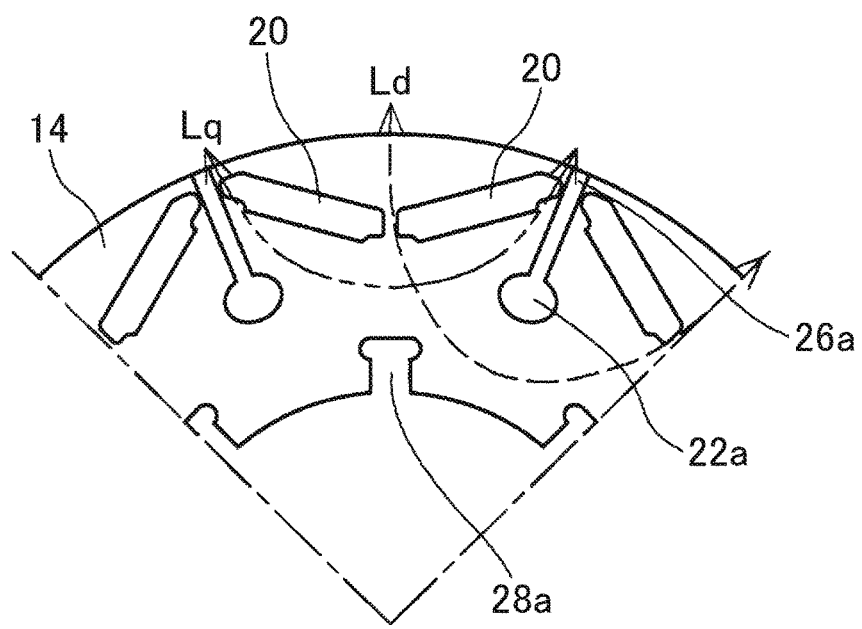
FIG. 4B is a view illustrating one example of an electromagnetic steel sheet.

A second type is an electromagnetic steel sheet 14 in which a plurality of magnet holes 20, central apertures 22a, first slots 28a, and outer slots 26a are formed as illustrated in FIG. 4B. The electromagnetic steel sheet 14 of this type is disposed in the generally axial center of the rotor core 12. The first slots 28a are slots extending radially outwardly from the radially inner end along respective d-axes so as to constitute the first refrigerant passages 28. The outer slots 26a are slots extending radially inwardly from the radially outer end along respective q-axes so as to constitute the outer refrigerant passages 26. The central apertures 22a are connected to respective outer slots 26a.

Figure 4C:
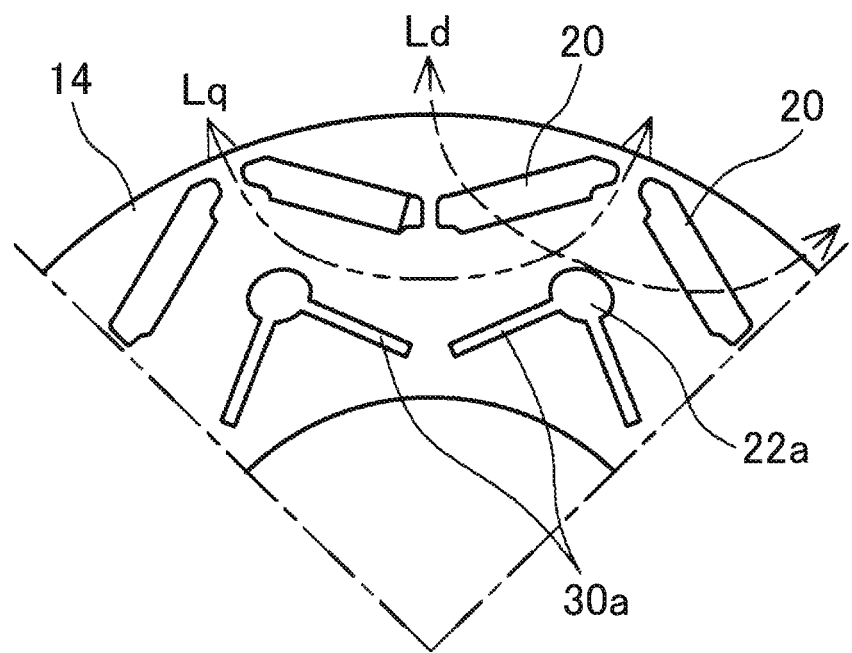
FIG. 4C is a view illustrating one example of an electromagnetic steel sheet.

A third type is an electromagnetic steel sheet 14 in which a plurality of magnet holes 20, central apertures 22a, and second slots 30a are formed as illustrated in FIG. 4C. The electromagnetic steel sheets 14 of this type are disposed on both sides of the electromagnetic steel sheet 14 of FIG. 4B in the axial direction. The second slots 30a are slots extending in a diagonal direction (a direction including both a radial component and a circumferential component) at the radially inside the magnet holes 20 and constitute the second refrigerant passage 30. The central apertures 22a are connected to the second slots 30a. The rotor core 12 having the core refrigerant passage can be formed by laminating such several types of electromagnetic steel sheets 14.

In the present embodiment, the central refrigerant passages 22 penetrating in the axial direction are provided and the dams 40 are provided at both ends of the central refrigerant passages 22. With such a configuration, in a case where an amount of the refrigerant supplied from the shaft refrigerant passage is small, the discharge of the refrigerant toward both axial ends is restrained by the dams, so that the refrigerant is released to the gap from the outer refrigerant passages, thereby making it possible to effectively cool down the radially outer surface of the rotor core, the radially inner surface of the stator core, and the stator coil. Further, in a case where the amount of the refrigerant supplied from the shaft refrigerant passage is large, the refrigerant is partially discharged across the dams toward both axial ends, thereby making it possible to restrain an increase in a motor torque loss due to dragging of the refrigerant caused when an excessive amount of the refrigerant is released from the outer refrigerant passages. The refrigerant supplied from the shaft refrigerant passage 52 receives a force directed radially outwardly due to a centrifugal force. As a result, most of the refrigerant moves to the gap G through the central refrigerant passages 22 and the outer refrigerant passages 26 from the inner refrigerant passages 24, as indicated by a bold continuous line in FIG. 3.

Here, the dams 40 provided in a standing manner from the radially outer side are placed at both axial ends of the central refrigerant passages 22. The refrigerant staying in the central refrigerant passages 22 is drawn toward a radially outer side of the central refrigerant passages 22 due to a centrifugal force. The refrigerant staying in the central refrigerant passages 22 is stopped by the dams 40 provided in a standing manner from the radially outer side. As a result, in a case where an amount of the refrigerant to be stayed in the central refrigerant passages 22 is small, the refrigerant is not discharged outside from the openings provided at both axial ends, but is released from the outer refrigerant passages. As a result, it is possible to effectively prevent the refrigerant in the gap G from becoming insufficient.

When the refrigerant to be supplied to the rotor 10 is increased so as to improve coolability, the amount of the refrigerant to be stayed in the central refrigerant passages 22 increases. When the refrigerant crosses the dams 40, the refrigerant thus crossing the dams 40 is discharged outside from the openings provided on both axial ends. This reduces a ratio of a refrigerant amount to be discharged from the outer refrigerant passages with respect to a refrigerant amount supplied from the shaft refrigerant passage, thereby making it possible to restrain an increase in a motor torque loss due to dragging of the refrigerant caused when an excessive amount of the refrigerant is released from the outer refrigerant passages. Further, since the refrigerant is released from the axial end surfaces, an axial flow as indicated by a chain double-dashed line in FIG. 3 is caused in the refrigerant inside the central refrigerant passages 22. Further, when a flow speed of the refrigerant is improved, the rotor 10 can be cooled down more effectively.

Further, in the present embodiment, the refrigerant is released to the gap G from the outer refrigerant passages 26. The outer refrigerant passages 26 are provided only in the generally axial center. On this account, the outlets for the refrigerant are provided only in the generally axial center on the radially outer surface. As a result, as indicated by a thick line in FIG. 3, the refrigerant released from the generally axial center is quickly released outside the gap G without interfering with a refrigerant released from other outlets in a course of moving toward both axial ends of the gap G. This consequently makes it possible to effectively prevent a drag loss caused due to retention of the refrigerant.

Further, in the present embodiment, the refrigerant flows through both the central refrigerant passages 22 on the radially inner side relative to the permanent magnets 16 and the gap G on the radially outer side relative to the permanent magnets 16. As a result, the permanent magnets 16 are cooled down from both the radially inner side and the radial side, thereby making it possible to cool down the permanent magnets 16 more effectively. This accordingly makes it possible to prevent performance degradation and demagnetization of the permanent magnets 16 due to heat.

Further, in the present embodiment, the refrigerant passages are placed so as not to divide d-axis magnetic paths Ld and q-axis magnetic paths Lq. As a result, both a magnet torque and a reluctance torque can be utilized, thereby eventually making it possible to prevent degradation of the output performance of the rotary electric machine 60.

That is, as indicated by a broken line in FIGS. 4A to 4C, a d-axis magnetic path Ld travels in the rotor core 12 so as to pass through a center of one magnetic pole 18, and then goes out of the rotor core 12 so as to pass through a center of another magnetic pole 18 adjacent to the one magnetic pole 18 across a q-axis. Further, as indicated by an alternate long and two short dashes line in FIGS. 4A to 4C, a q-axis magnetic path Lq travels in the rotor core 12 from a salient pole formed between the magnetic poles 18, and then goes out of the rotor core 12 so as to pass through another salient pole adjacent thereto across a d-axis magnetic path Ld. When a slot or the like is provided in a middle of the d-axis magnetic path Ld or the q-axis magnetic path Lq, the magnet torque and the reluctance torque decrease.

In the present embodiment, the second refrigerant passages 30 extending in the diagonal direction and the outer refrigerant passages 26 extending on the q-axes are formed in different electromagnetic steel sheets 14 so as not to obstruct the d-axis magnetic paths Ld, and the first refrigerant passages 28 are extended only in a middle of the electromagnetic steel sheet 14 in the radial direction. Accordingly, the d-axis magnetic paths Ld are not divided by the refrigerant passage, thereby consequently making it possible to restrain a magnetic resistance of the d-axis magnetic paths Ld to be low. Further, in the present embodiment, the outer refrigerant passages 26 extending on the q-axes are extended only to the radially inside the permanent magnets 16, so as not to obstruct the q-axis magnetic paths Lq. Accordingly, the q-axis magnetic paths Lq are not divided by the refrigerant passage, thereby consequently making it possible to restrain a magnetic resistance to be low.

Note that the configuration described above is one example, and the other configurations may be changed, provided that the core refrigerant passage includes the central refrigerant passages 22 extending in the axial direction in a penetrating manner, the inner refrigerant passages 24 communicating the shaft refrigerant passage 52 with the central refrigerant passages 22, and the outer refrigerant passages 26 communicating the central refrigerant passages 22 with the gap G in the generally axial center, and the dams 40 are provided at both axial-end sides of the central refrigerant passages 22 relative to the outer refrigerant passages 26.

For example, the dam 40 of the central refrigerant passage 22 may be constituted not by one electromagnetic steel sheet 14, but by more electromagnetic steel sheets 14 (three in an example illustrated herein) as illustrated in FIG. 5. Further, as illustrated in FIG. 5, the dam 40 may be formed in an inclined manner so as to be lowered toward an outer side in the axial direction. With such an inclination, a passage 40a that guides the refrigerant crossing the dam 40 toward a diagonally outer side, that is, a direction toward a coil end is formed. With such a passage 40a, the coil end can be also cooled off effectively.

Further, in the present embodiment, the first refrigerant passages 28, the second refrigerant passages 30, and the outer refrigerant passages 26 are constituted by slots that penetrate the electromagnetic steel sheets 14, but these refrigerant passages may be constituted by grooves that do not penetrate the electromagnetic steel sheet 14, instead of the slots. Further, the first refrigerant passages 28, the second refrigerant passages 30, and the outer refrigerant passages 26 may be constituted not by one electromagnetic steel sheet 14, but by a plurality of electromagnetic steel sheets 14. For example, as illustrated in FIG. 5, three electromagnetic steel sheets 14 in which outer slots 26a are formed may be laminated. In this case, a thickness (an axial distance) of the outer refrigerant passage 26 is equivalent to a total thickness of three electromagnetic steel sheets 14, thereby making it possible to increase a sectional area of the outer refrigerant passage 26. Further, the present embodiment exemplifies only the rotor core 12 made of a laminated steel sheet formed by laminating the electromagnetic steel sheets 14. However, the rotor core 12 may be made of a dust core or the like other than the laminated steel sheet, provided that a characteristic of strength and a magnetic property can be maintained, for example.

Further, in the present embodiment, the first refrigerant passage 28 is placed on the d-axis. However, the first refrigerant passage 28 may not be provided on the d-axis but may be provided on other places, provided that the first refrigerant passage 28 is formed at a position deviating from the q-axis in the circumferential direction. Further, the number of refrigerant passages may be changed appropriately. For example, the central refrigerant passage 22 may be formed every two magnetic poles. Along with this, the number of first refrigerant passages 28, second refrigerant passages 30, and outer refrigerant passages 26 may be also adjusted. Further, in the present embodiment, the dams 40 are provided at the axial ends of the central refrigerant passages 22, but may be provided at other positions, if the dams 40 are placed on both axial-end sides relative to the outer refrigerant passages 26. For example, the dam 40 may be provided at an intermediate position between the outer refrigerant passage 26 and the axial end.

Further, in the above description, only the rotor 10 in which the permanent magnets 16 are disposed in a V-shape is exemplified. However, the permanent magnets 16 may have a rectangular shape or a horseshoe shape, provided that the rotor 10 is configured such that the permanent magnets 16 are embedded in the rotor core 12.

What is claimed is:

1. A rotor of a rotary electric machine, the rotor comprising:
    a rotor core;
    a permanent magnet embedded in the rotor core; and
    a rotating shaft, the rotor being supported by the rotating shaft, the rotating shaft including a shaft refrigerant passage through which a refrigerant flows;
        the rotor core including at least one core refrigerant passage that guides the refrigerant supplied from the shaft refrigerant passage to a radially outer end of the rotor core such that the refrigerant is released to a gap between the rotor core and a stator,
        the core refrigerant passage including:
            a central refrigerant passage provided radially inside the permanent magnet so as to extend in an axial direction, the central refrigerant passage being opened on axial end surfaces of the rotor core,
            an inner refrigerant passage communicating the shaft refrigerant passage with the central refrigerant passage,
            an outer refrigerant passage communicating the central refrigerant passage with the gap, and
            dams provided on both axial-end sides of the central refrigerant passage, the dams being provided axially outside the outer refrigerant passage, the dams being projecting from a radially outer side toward a radially inner side in the central refrigerant passage.

2. The rotor of the rotary electric machine, according to claim 1, wherein
    the outer refrigerant passage is provided at only one position in the axial direction.

* * * * *